No. 868,531. PATENTED OCT. 15, 1907.
C. T. CROCKER.
CONTROLLER OPERATING MECHANISM.
APPLICATION FILED NOV. 29, 1905.
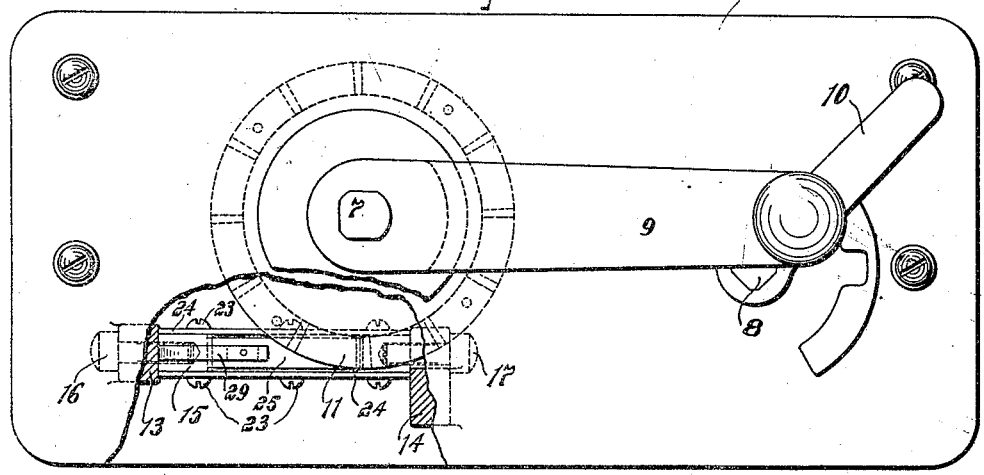
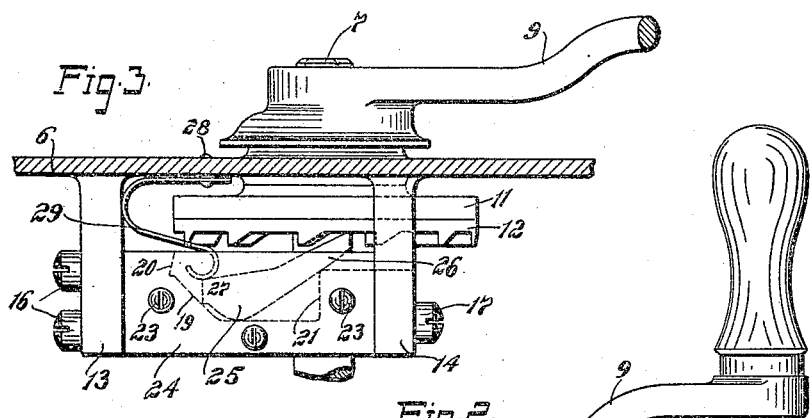
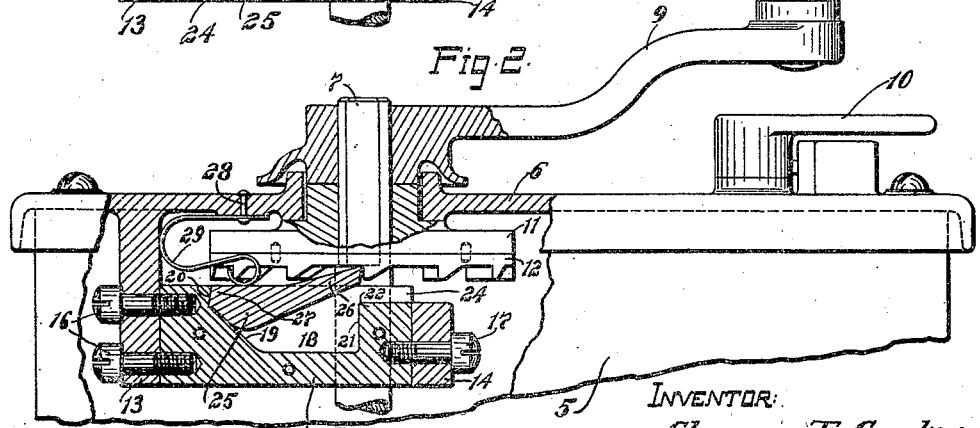
WITNESSES:
George J. Schwatz
Fred J. Kinsey
INVENTOR:
Clarence T. Crocker.
BY
Chas. E. Lord
ATTORNEY

UNITED STATES PATENT OFFICE.

CLARENCE T. CROCKER, OF NORWOOD, OHIO, ASSIGNOR TO THE BULLOCK ELECTRIC MANUFACTURING COMPANY, A CORPORATION OF OHIO.

CONTROLLER-OPERATING MECHANISM.

No. 868,531.

Specification of Letters Patent.

Patented Oct. 15, 1907.

Application filed November 29, 1905. Serial No. 289,554.

*To all whom it may concern:*

Be it known that I, CLARENCE T. CROCKER, a citizen of the United States, residing at Norwood, in the county of Hamilton and State of Ohio, have invented certain new and useful Improvements in Controller-Operating Mechanism, of which the following is a full, clear, and exact specification.

This invention relates to improvements in the operating means of electric motor controllers, particularly to those adapted for use in connection with electric railway equipments.

The object of my invention is to provide means whereby positive step-by-step movement of the controller is obtained, so as to prevent a too rapid supply of current to the motor or motors controlled thereby; to protect the motor or motors against overload; and to prevent an unnecessary waste of current in starting.

In carrying out my invention, I provide within the casing of a controller, a ratchet mechanism, one member of which is mounted on the shaft, the parts of said mechanism being so arranged and constructed that only a step-by-step forward movement of the handle is permitted.

More specifically considered, my invention consists in the combination of a controller casing, a handle extending therethrough, a ratchet plate mounted on the shaft within the casing, a pawl supported on a stationary member and adapted to engage the teeth of the plate, and a spring bearing on the pawl, the parts being so constructed, that when the handle is moved backward, the pawl will be moved from one tooth to a position to be engaged by the next adjacent tooth when the handle is moved forward.

My invention still further consists in the details of construction, and arrangements and combinations of parts described in the specification and set forth in the appended claims.

For a better understanding of my invention, reference is had to the accompanying drawing, in which Figure 1 is a top plan view of a controller embodying my invention, parts being broken away for the sake of clearness; Fig. 2 is an elevation of the upper part of the controller, parts being broken away to illustrate my invention more clearly; and Fig. 3 is a section through the cap of the controller casing, the mechanism whereby a step-by-step movement is obtained being shown in elevation.

Referring now to the figures of the drawing, the controller casing 5 is provided with a cap plate or cover 6, through which projects the upper ends of the main drum shaft 7 and the reversing switch shaft 8, which are provided with the customary operating handles 9 and 10. I provide in the casing a ratchet mechanism, by means of which a rapid movement of the handle in the starting of the motor is prevented. The handle can only be moved forward step by step, so as to permit the motor or motors to speed up to such an extent that a proper counter-electromotive force is generated for a certain amount of external resistance in the motor circuit before the next step of external resistance is cut out. Thus the motors are protected against damage due to current overloads and also an economy is effected in the operation of the system by preventing an unnecessary waste of current in starting the motor or motors. I also provide on the shaft 7, directly under the cap 6, a ratchet member which consists preferably of a disk 11 made of copper, brass or other non-magnetic material, on the under face of which is secured the notched disk or plate 12. Depending from the under side of the cap 6 within the casing are two lugs 13 and 14. These lugs are suitably spaced apart and support the bridging cross-member 15, by screws 16 and 17. The member 15 is preferably made of steel. It is provided with a recess or depression 18, one end of which has two inclined walls 19 and 20, and the opposite end of which has a vertical wall 21.

The end of the member 15 adjacent the lug 14 and vertical wall 21, is lower than the opposite end, forming a shoulder 22, the purpose of which will be explained. Secured to each side of the member 15 by screws 23 is a plate 24, which plates form with the member 15 a small compartment or inclosure. Located within this compartment is a ratchet finger or pawl 25, made preferably of hard steel. This finger rests freely within the compartment. In one position it is adapted to engage the teeth of the ratchet and the inclined walls 19 and 20 for limiting the movement of the controller handle, and permitting a step-by-step movement thereof. This finger is of irregular shape having a comparatively long narrow neck portion 26 at one end, and at the other end an enlarged portion 27 having two inclined surfaces adapted to engage, in one of its positions, the two inclined walls 19 and 20 of the compartment in the member 15. Secured at 28 to the under side of the cap 6, is a curved spring 29, the free end of which bears upon the finger 25.

The operation of my device will now be explained. When the parts are in the position shown in Fig. 2, the large end of finger 25 engages the inclined faces 19 and 20 and the narrow end 26 of the finger is in engagement with one tooth of the ratchet plate and is out of engagement with the shoulder 22. It is seen that the shape of the engaging faces of the finger 25 and the walls 19 and 20 is such that no pressure of the handle tending to move the shaft and drum in the clockwise direction can result in the movement to the finger 25. Now in order that the handle may be moved in a clockwise direction to cut out a section of resistance, the handle must first be moved in a counter-clockwise direction for a very short distance, to permit end 26 of the finger to drop out of engagement with the tooth of the ratchet plate onto the shoulder 22, and to permit the spring 29 to force the finger to the position shown in Fig. 3. It is seen that when the handle is moved a slight distance in a counter-clockwise direction, and when the end 26 of finger 25 is released from one of the notches and drops down until it engages the shoulder 22 of the member 15, the spring 29 forces the rear end of the finger downward and forward and the end 26 upward and forward to the opposite side of the tooth with which it was formerly in engagement, as shown in Fig. 3. It is seen that the handle can now be moved one step in a clockwise direction, when the next adjacent tooth will engage the end 26 of the finger 25 and raise the latter again to the position shown in Fig. 2. If it is desired to move the handle a step further in the clockwise direction, the same operation must be repeated.

The teeth on the plate 12 are so arranged that they do not interfere with the free movement of the controller handle backward towards the "off" position.

In the appended claims I aim to cover all modifications and changes which do not involve a departure from the spirit and scope of my invention.

It is seen that the structure is simple, composed of few parts, and hence will not easily get out of order.

Another great advantage is that the mechanism whereby the step-by-step movement is obtained is all within the casing, and hence can not be tampered with by the operator, who might desire to quickly throw the handle to the running position.

Having thus described my invention, what I claim as new and desire to secure by Letters Patent is:—

1. In combination, a controller shaft, a handle and a notched member carried thereby, a pawl adapted to engage the notches of said member, and means for causing said pawl to engage one of said notches when the handle is moved forward, and to escape and move beyond said notch when the handle is moved slightly backward.

2. In combination, a controller shaft, a handle mounted on said shaft, a notched member also on said shaft, a pawl adapted to engage the notches on said member, the parts being so constructed that as the handle is moved slightly backward the pawl will move out of engagement with one of the notches into position to be engaged by another of said notches when the handle is moved forward.

3. In combination, a controller casing, a shaft extending therethrough, a handle on said shaft without said casing, a ratchet disk carried by said shaft within the casing, a ratchet finger adapted to engage said ratchet teeth, the finger being so mounted and the parts being so constructed that when the handle is moved slightly backward, the finger will move out of engagement with one tooth into position to be engaged by the next adjacent tooth when the handle is moved forward.

4. In combination, a controller casing, a shaft extending therethrough and having at its outer end a controller handle, a ratchet plate on said shaft within the casing, a pawl supported adjacent thereto for engaging the teeth of the ratchet plate, and means for moving said finger out of the path of one tooth into position to be engaged by another tooth when the handle is moved slightly backward.

5. In combination, a controller casing, a shaft extending therethrough and having a controller handle on its outer end, a notched plate mounted on said shaft within the casing, a ratchet finger or pawl movably mounted and adapted in one position to engage a tooth of the ratchet plate, and means, when the handle is moved slightly in one direction, for moving said pawl away from one tooth to a position for engaging the next adjacent tooth when the handle is moved in the opposite direction.

6. In combination, a controller casing, a shaft extending therethrough and carrying at its outer end a controller handle and within the casing a notched plate, and a pawl adapted to engage the notches of said plate, said pawl being supported from the cover or cap of the casing, and the parts being so constructed and arranged that when the handle is moved backward a slight distance, the pawl will move out of engagement with one tooth to a position to engage the next adjacent tooth when the handle is moved forward.

7. In combination, a controller casing, a shaft extending therethrough and carrying at its outer end a controller handle and within the casing a ratchet plate, a pawl located adjacent said plate and adapted to engage the teeth thereof, and a spring bearing on said pawl and adapted, when the handle is moved slightly backward, to move the pawl from one tooth to a position to engage the next adjacent tooth when the handle is moved forward.

8. In combination, a controller casing, a shaft extending therethrough, a controller handle mounted on the outer end thereof, a ratchet plate mounted on said shaft within the casing, a pawl supported from the cover of the casing adjacent the ratchet plate and adapted to engage the teeth thereof to permit a step-by-step movement, and a spring mounted on the under side of the cap or cover and adapted to move the pawl out of the path of one tooth to a position to be engaged by the adjacent tooth on forward rotation of the handle.

9. In a controller for electric motors, the combination of a rotatable shaft, an operating handle therefor, a disk fixed on said shaft and having its lower face notched to form ratchet teeth, a stationary support, and an unattached pawl resting on said support and normally projecting upward into the path of the teeth of said disk.

10. In a controller for electric motors, the combination of a rotatable shaft, an operating handle therefor, a disk fixed on said shaft and having its lower face notched to form ratchet teeth, a stationary support, an unattached pawl resting on said support and normally projecting upward into the path of the teeth of said disk, and means for permitting the pawl to be moved out of the path of said teeth.

In testimony whereof I affix my signature, in the presence of two witnesses.

CLARENCE T. CROCKER.

Witnesses:
FRED J. KINSEY,
ARTHUR F. KWIS.